Sept. 4, 1951  G. VIGNERI  2,566,755
MECHANICAL MOTOR

Filed June 4, 1946  4 Sheets-Sheet 1

INVENTOR.
Giuseppe Vigneri
BY Victor J. Evans & Co.
ATTORNEYS

Sept. 4, 1951 G. VIGNERI 2,566,755
MECHANICAL MOTOR
Filed June 4, 1946 4 Sheets-Sheet 2

INVENTOR.
Giuseppe Vigneri
BY Victor J. Evans & Co.
ATTORNEYS

Sept. 4, 1951      G. VIGNERI      2,566,755
MECHANICAL MOTOR
Filed June 4, 1946      4 Sheets-Sheet 3
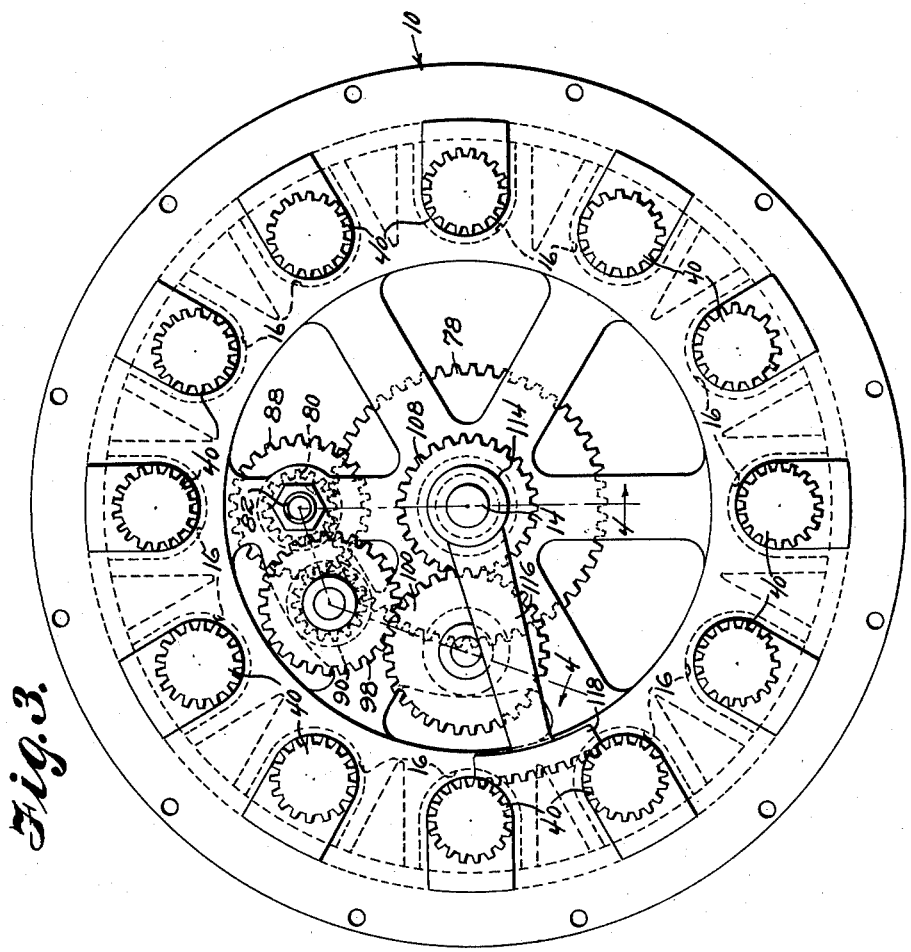
INVENTOR.
Giuseppe Vigneri
BY Victor J. Evans & Co.
ATTORNEYS Sept. 4, 1951 G. VIGNERI 2,566,755
MECHANICAL MOTOR
Filed June 4, 1946 4 Sheets-Sheet 4
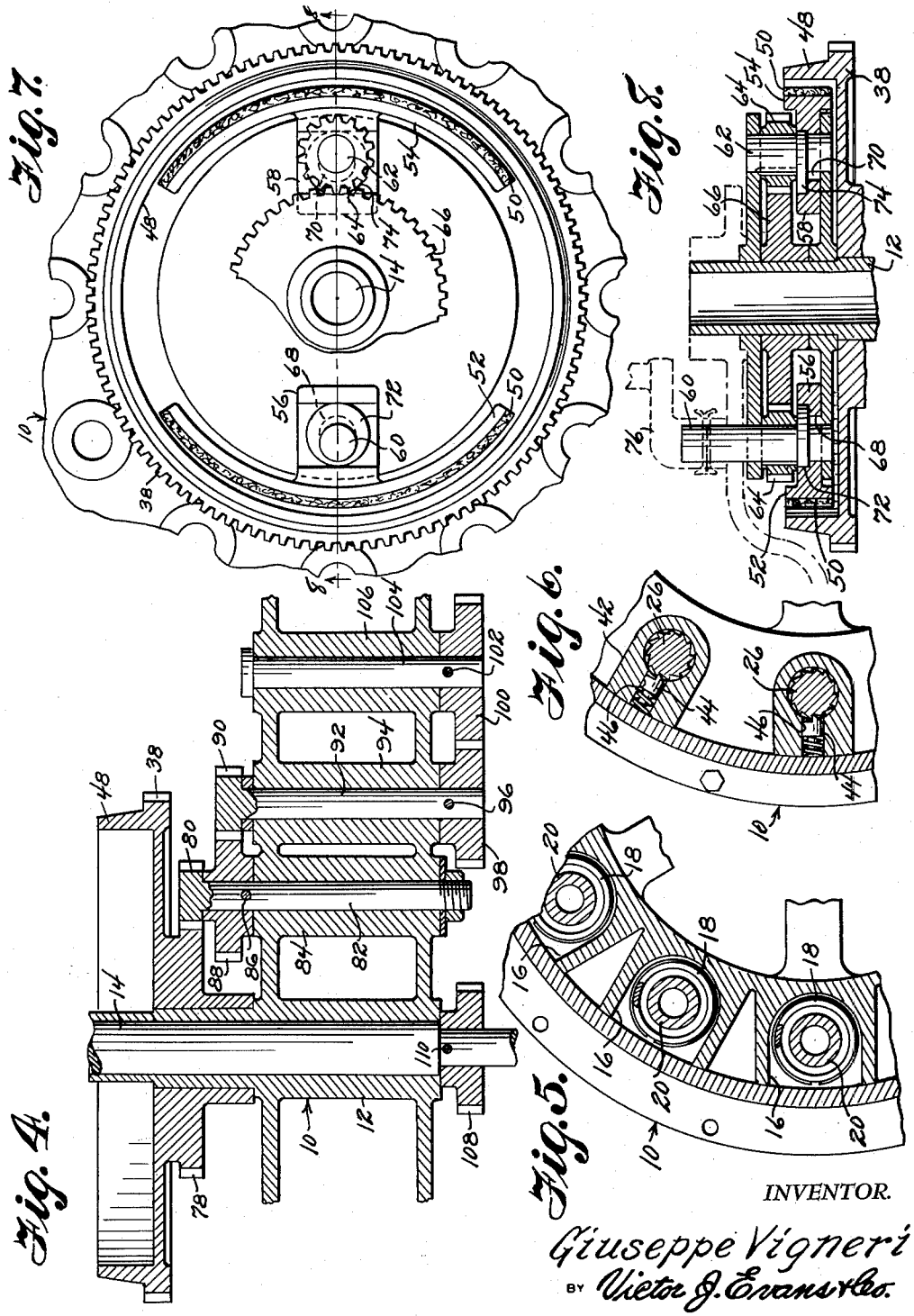
INVENTOR.
Giuseppe Vigneri
BY Victor J. Evans & Co.
ATTORNEYS Patented Sept. 4, 1951

2,566,755

UNITED STATES PATENT OFFICE 2,566,755

MECHANICAL MOTOR

Giuseppe Vigneri, Hoboken, N. J.

Application June 4, 1946, Serial No. 674,221

1 Claim. (Cl. 185—37)

The invention relates to improvements in a mechanical motor.

The object of the invention is to provide a multiple spring motor in which the individual springs are partially rewound, one at a time and in succession, upon every revolution of the driven shaft by the combined power of the remaining springs, whereby the motor will run for a greater length of time.

Another object of the invention is to provide a simple and effective spring motor of this type which can be cheaply manufactured, readily assembled and the individual springs easily replaced.

With the above and other objects and advantages in view the invention consists of the novel details of construction, arrangement and combination of parts more fully hereinafter described, claimed and illustrated in the accompanying drawings in which:

Figure 3 is side elevation looking from the opposite side from that of Figure 1.

Figure 4 is a sectional view on the line 4—4 of Figure 3.

Figure 5 is a sectional view on the line 5—5 of Figure 2.

Figure 6 is a sectional view on the line 6—6 of Figure 2.

Figure 7 is an enlarged detailed view of the brake construction and

Figure 8 is a sectional view on the line 8—8 of Figure 7.

Figure 1:
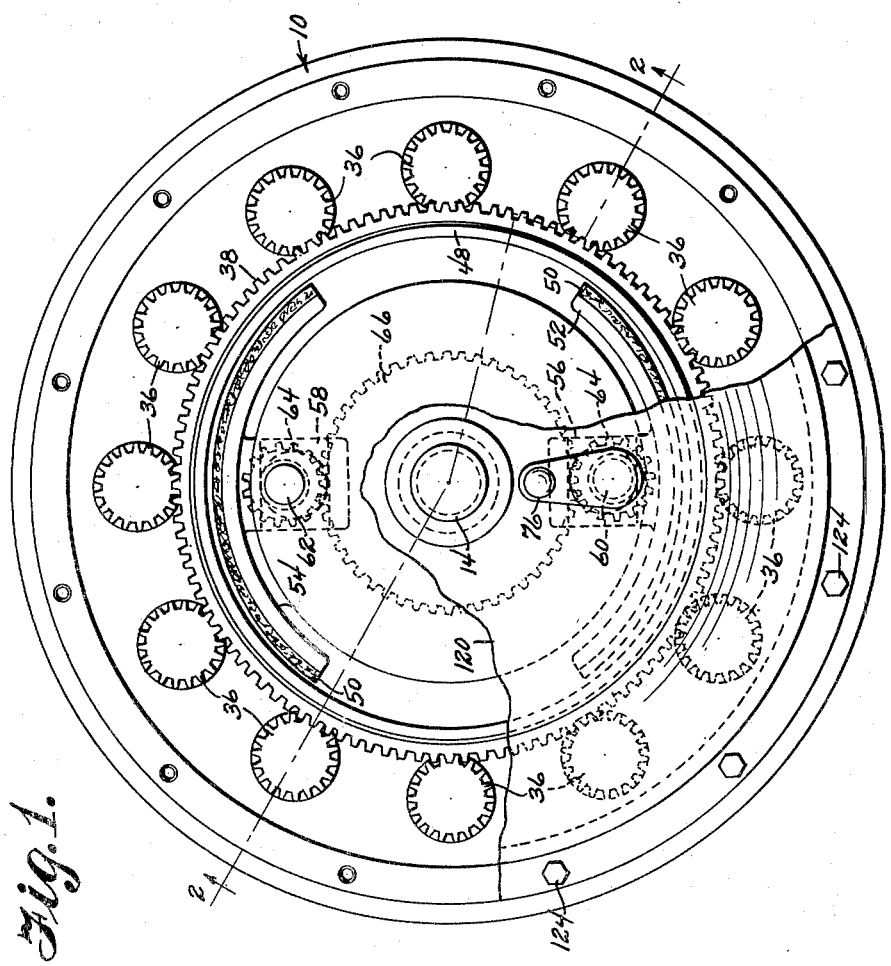
Figure 1 is a side elevation of an embodiment of the invention partly broken away.

Referring more in detail to the drawings, 10 designates a circular motor frame which may be supported in any desired manner against rotation and has at its center a shaft bearing 12 extending therethrough and in which rotates the shaft 14. The motor frame 10 is provided with twelve cylindrical housings 16 in each of which is arranged a coil spring 18 surrounding the tubular drum 20.

Each of the drums 20 has a reduced shaft 22 keyed thereto at 24 and each shaft has formed thereon a ratchet gear 26. The opposite end of the drums 20 receive a reduced shaft 28 which has keyed thereto at 30 the annular flanged collar 32 which receives one end of the spring 18 the other end of the spring to be connected to the annular flange 34 adjacent the opposite end of the drum 20. The opposite ends of the shafts 28 have formed thereon pinion gears 36 which mesh with the ring gear 38. Therefore the gear 36 will be caused to rotate by the spring 18 since the lower end of the spring is held against rotation by means of the flange 34, and the shaft 22 carries the gear 40, the purpose of which will be later explained.

Gears 26 rotate in a housing 42 in the motor frame 10 and spring pressed dogs 44 are mounted in a recess 46 in the housing 42 for engagement with the gears 26. The dogs 44 retain the drum 20 against rotation in one direction by the tension of the spring 18 but the drum may be rotated by hand for winding the spring in the opposite direction as shown in Figure 6.

Mounted in the motor frame 10 and joined integral with the ring gear 38 is a drum 48 which is free to rotate on the shaft bearing 12.

The inner periphery of the drum 48 forms a brake drum adapted to be engaged by the brake lining 50 carried by the brake shoes 52 and 54.

These brake shoes are mounted within the drum 48 and are provided with inwardly extending portions 56 and 58 having openings therethrough in which are mounted the shafts 60 and 62. The shafts are provided with gears 64 which mesh with the gear 66 rotatably mounted in the drum 48 and thus the shafts 60 and 62 are simultaneously rotated. The portions 56 and 58 of the brake shoes 52 and 54 are provided with recesses 68 and 70 in which rotate the cams 72 and 74 carried by the shafts 60 and 62. The end of the shaft 60 is adapted to receive a crank 76 whereby the same is rotated. By this arrangement it will be seen that the shaft 60 is rotated which in turn rotates the gear 66 meshing with the gear 64 on the shaft 62 so that the shafts 60 and 62 are rotated together. The cams carried by the shafts force the brake shoes outwardly for engagement with the drum 48 to prevent rotation thereof and the ring gear 38 formed thereon.

The drum 48 has formed on the lower surface thereof a ring gear 78 of lesser diameter than gear 38 and which drives a pinion gear 80 formed on the bolt shaft 82 mounted in bearing 84 in the motor frame 10. Fixed to the shaft 82 at 86 is the gear 88 which meshes with a gear 90 formed on the upper end of shaft 92 mounted in a second bearing 94 formed on the bearing 84 and the shaft 92 has fixed thereto at 96 on the opposite end thereof a gear 98 which meshes with a gear 100 fixed at 102 to a shaft 104 mounted in a bearing 106 formed on the bearing 92.

Thus pinion 80 drives gears 88 and 90 which in turn drive gears 98 and 100 and gear 100 meshes with a gear 108 fixed on shaft 14 at 110.

Figure 2:
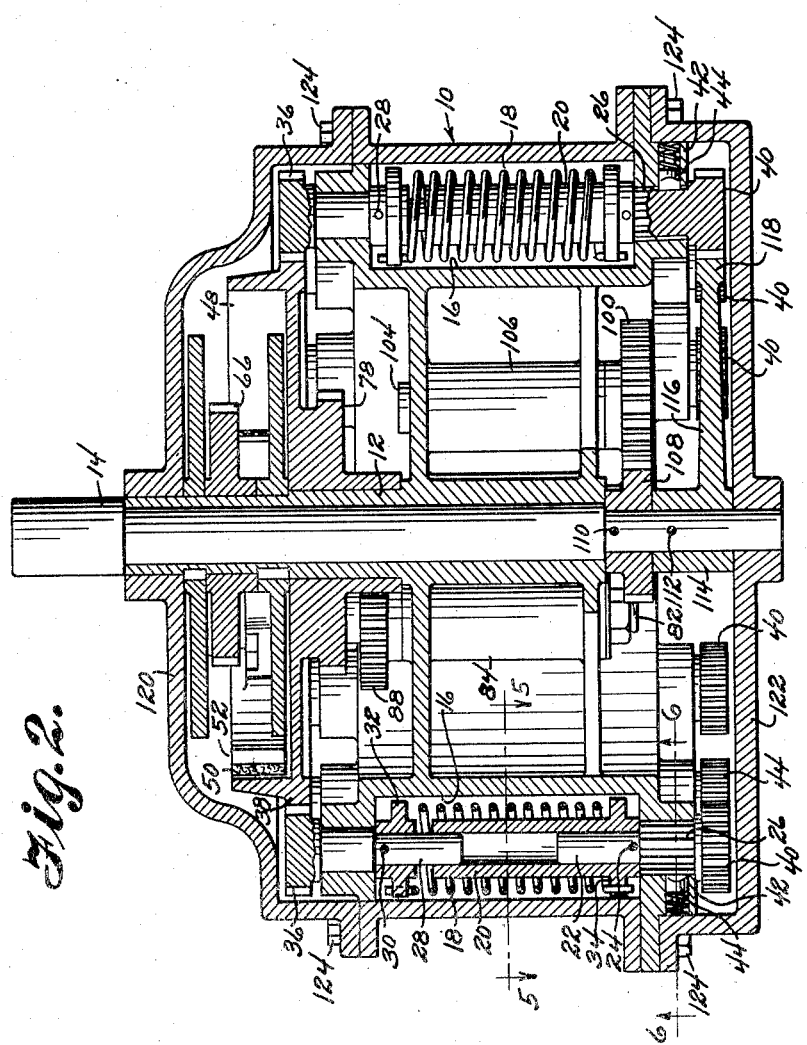
Figure 2 is a sectional view on the line 2—2 of Figure 1.

The shaft 14 has fixed thereto at 112 a sleeve 114 carrying an arm 116 provided at its outer end with a segment 118 adapted to engage the gears 40 carried by the drums 20 on which the springs 18 are mounted as shown in Figures 2 and 3 of the drawings.

The motor frame 10 is provided with removable end covers 120 and 122 respectively which are secured to the frame by fasteners 124.

In operation the springs within the twelve housings are all tightly wound manually the gears 40 providing means for winding the same. In order that access may be had to the gears 40 for the winding of the motor the fasteners 124 are removed. The cover 122 being removably connected to the frame by the fasteners 124 may then be removed so that the gears 40 can be rotated to wind the springs.

It will be understood that before the springs are wound the crank 76 is rotated so that the brake shoes 52 and 54 engage the inner periphery of the drum 48 of the ring gear 38 and locks the same against rotation. Upon the release of the brake shoes the spring drums are caused to rotate by the exertion of the springs which in turn rotate the ring gear 38. The rotation of the ring gear 38 causes rotation of gear 78 and of its engagement with pinion gear 80 rotates gear trains 88, 90 and 98 and 100 the engagement of which with gear 108 rotates the shaft 14 from which necessary power is derived. The rotation of the shaft 14 causes the arm 116 to travel around in a clockwise direction and the segmented rack 118 engaging the gears 40 carried by the spring drums 20 while winding one of the spring drums the springs of the remaining eleven are exerting the power of these springs on the ring gear 38 to cause a rotation thereof which by means of the previously mentioned gears causes rotating of the shaft 14. By operating the crank 76 it will be noted that the speed of the ring gear 38 can be controlled and therefore the speed of the drive shaft 14.

It is believed that the operation and construction of the motor will be apparent to those skilled in the art and it is to be understood that changes in the details of construction, arrangement and combination of parts may be resorted to provided they fall within the spirit of the invention and the scope of the appended claim.

Having thus described the invention what is claimed as new and desired to be secured by Letters Patent is:

A spring motor comprising a frame, a shaft rotatably mounted in the frame, a drum rotatably mounted in the frame around the shaft, a ring gear on the outer periphery of the drum, a series of housings arranged around the ring gear, tubular spring drums within the housings, a shaft loosely mounted in the upper end of each of said tubular spring drums, a gear fixed to each of said shafts and meshing with the ring gear, a shaft fixed in the lower end of each of said tubular spring drums, rewinding gears carried by said latter shafts, a housing formed on the lower end of said first said housings, a spring pressed dog in said housings adapted to engage said rewinding gears to permit rotation of said gears in one direction but to prevent rotation of said gears in the opposite direction, a ring gear formed on the lower surface of said first said drum, a series of gear trains connecting said last mentioned ring gear with a gear mounted on said first said shaft, an arm carried by the latter shaft and having a segmental rack adapted to engage the rewinding gears for rotating the same in succession one at a time, brake shoes mounted with said first said drum for engagement with said first said drum for locking the drum in fixed relation to the frame, means carried by the first said drum for moving said shoes into and out of engagement with said first said drum, bearings for said gear trains formed integral with each other and with said frame, and said gear trains are fixed to shafts mounted in said bearings.

GIUSEPPE VIGNERI.

REFERENCES CITED

The following references are of record in the file of this patent:

UNITED STATES PATENTS

| Number | Name | Date |
| --- | --- | --- |
| 1,807,169 | Persico | May 26, 1931 |
| 2,345,954 | Vigneri | Apr. 4, 1944 |